WILLIAM H. HURLBUT.
Improvement in Harvester-Rakes.

No. 126,705. Patented May 14, 1872.

UNITED STATES PATENT OFFICE.

WILLIAM H. HURLBUT, OF MIRABILE, MISSOURI.

IMPROVEMENT IN HARVESTER-RAKES.

Specification forming part of Letters Patent No. 126,705, dated May 14, 1872.

Specification describing a new and useful Improvement in Automatic Rake for Reaping-Machines, invented by WILLIAM H. HURLBUT, of Mirabile, in the county of Caldwell and State of Missouri.

This invention relates to apparatus connected with reaping-machines for the purpose of removing the cut grain from the platform of the machine; and consists in mechanism for operating the rake as hereinafter more fully described, and subsequently pointed out in the claims.

Figure 1:
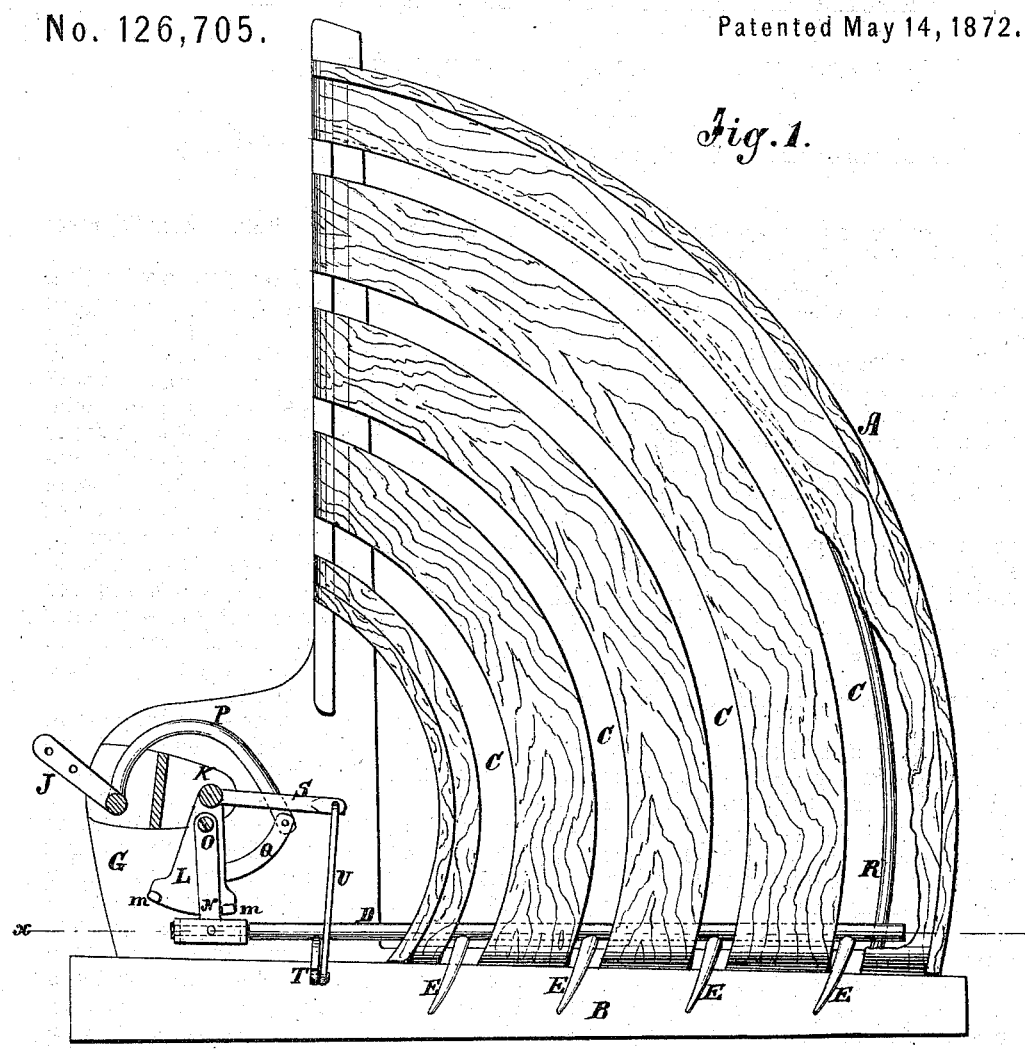
Figure 2:
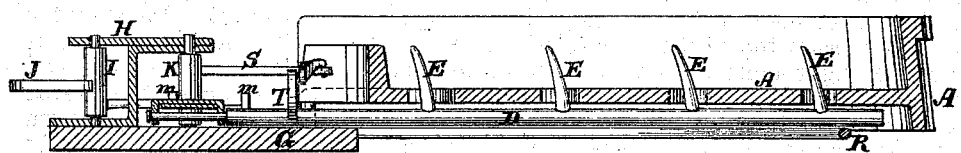

In the accompanying drawing, Figure 1 is a top view, showing the platform, the rake, and the mechanism by means of which the various motions of the rake are produced. Fig. 2 is a vertical section of Fig. 1 taken on the line $x\,x$.

Similar letters of reference indicate corresponding parts.

A is the platform. B is the cutter-bar of the reaper. C represents a series of circular slots through the platform, through which the rake-teeth project when raking. D is the rake-head, and E the teeth. G is a portion of the platform extending outward from the slotted portion, for supporting the mechanism by which the rake is operated. H is a stand, consisting of horizontal plates of metal connected together, and attached rigidly to the platform G, as seen in the drawing. I is a vertical shaft, which is confined so as to turn on journals in the stand, to which shaft the operating-lever J is attached. K is another vertical shaft, confined in the stand and allowed to turn or partially revolve. L is a horizontal plate, attached rigidly to the shaft K, upon the two corners of which are lugs, $m\,m$, projecting upward. N is a T-shaped arm, the bottom end of which is pivoted to the plate L at the point $o$. The cross or top of the T has its ends bent down at right angles. The end of the rake-head D passes through these ends, as seen in Fig. 2, as through boxes, the end of the head being as a long journal which turns in the boxes. P is a curved rod, one end of which is rigidly attached to the upright shaft I. Q is a bar, which is pivoted to the other end of P, at one end. The other end of Q is pivoted to the plate L. The T-arm N rests upon the plate L.

The operating-lever J receives a vibrating motion from the reaper, produced in any of the well-known ways, which vibrating motion is imparted to the plate L and shaft K by means of the curved rod P and pivoted bar Q. This motion is equal to about one-fourth of an entire revolution, and the rake is made to describe about one-fourth of an entire circle by means of the projecting lugs $m\,m$ on the plate L, which, at each vibration of the plate, come in contact with the T-arm N, and carries the T and the rake back and forth. This movement of the rake is beneath the platform A. The outer end of the rake-head is supported parallel with the platform by the curved rod R, (see Fig. 1,) where the platform is broken away to show the rod.

In addition to this circular sweeping motion of the rake, it is necessary that it should have a revolving motion, in order to raise and depress the teeth. This revolving motion of the rake is produced by means of the horizontal arm S, which is rigidly attached to the upright shaft K, the curved arm T, which is rigidly attached to the rake-head and the connecting-rod U. As the upright shaft K is vibrated, the rake-head will be turned about one-fourth of an entire revolution. This raises the teeth of the rake to an upright position, when they sweep back from the cutter-bar, and the revolving motion depresses them to a horizontal position when they return.

As seen in the drawing, the teeth of the rake are resting on the cutter-bar. The connection of the operating mechanism with the reaper is such that the movement of the rake is under the control of the driver by means of a foot-lever, or otherwise. He can start the rake or stop it, when he pleases. When he starts the machine he can start the rake, and the quarter revolution of the rake which turns the teeth up through the slots of the platform will be the first movement, which is instantly succeeded by the horizontal sweep of the rake, which clears the platform of the grain, and stops when it gets to about a right angle with the cutter-bar. The teeth are now thrown down to a horizontal position beneath the platform by the revolving motion, and in that position the rake returns to the cutter-bar, as seen in Fig. 1.

The advantages of this arrangement are many, and must be apparent to all who are acquainted with this description of agricultural machinery.

Having thus described my invention, I claim as new and desire to secure by Letters Patent—

1. The rake D E, combined with levers U S T and horizontally-oscillating plates L m m, when attached to the same rock-shaft, K, as and for the purpose described.

2. The stand H, vertical shafts I and K, curved rod P, bar Q, plate L, T-arm N, and lever J, substantially as and for the purposes described.

WILLIAM H. HURLBUT.

Witnesses:
THOMAS G. KLEPPER,
WILLIS CLARK.